United States Patent [19]

Boucher et al.

[11] Patent Number: 4,667,915
[45] Date of Patent: May 26, 1987

[54] MARINE SENSOR MOUNTING MECHANISM

[75] Inventors: Stephen G. Boucher, Amherst; Maurice P. Lagace, Peterborough, both of N.H.

[73] Assignee: Airmar Technology Corporation, Amherst, N.H.

[21] Appl. No.: 806,285

[22] Filed: Dec. 6, 1985

[51] Int. Cl.$^4$ .................... H04R 1/44; A47F 5/10
[52] U.S. Cl. ..................... 248/293; 248/642
[58] Field of Search ............ 248/291, 293, 640-642, 248/284, 292.1

[56] References Cited

U.S. PATENT DOCUMENTS

| 945,762 | 1/1910 | Duleman | 248/293 |
|---|---|---|---|
| 2,773,383 | 12/1956 | Kersten | 73/187 |
| 2,911,938 | 11/1959 | Hulsebus | 115/17 |
| 2,954,950 | 10/1960 | Hart | 248/642 |
| 3,003,354 | 10/1961 | Wood | 73/187 |
| 3,082,623 | 3/1963 | Bosland | 73/182 |
| 3,175,396 | 3/1965 | Kock | 73/187 |
| 3,729,162 | 4/1973 | Salvato | 248/291 |
| 3,948,472 | 4/1976 | Metcalf | 248/642 |
| 4,013,249 | 3/1977 | Meyer | 248/642 |
| 4,279,602 | 7/1981 | Alter | 248/642 |
| 4,285,485 | 8/1981 | Burke | 248/291 |
| 4,325,318 | 4/1982 | Kitrell | 248/293 |
| 4,354,848 | 10/1982 | Hall | 248/642 |

FOREIGN PATENT DOCUMENTS 712506  10/1931  France ................. 248/291

Primary Examiner—Reinaldo P. Machado
Assistant Examiner—Alvin Chin-Shue
Attorney, Agent, or Firm—Hamilton, Brooks, Smith & Reynolds

[57] ABSTRACT

A marine sensor mounting mechanism is disclosed and comprises a mounting plate (2) securable to a boat, a two-branch bifurcated bracket (4) having one branch attached to the plate and a two-arm toggle link (6) having one arm pivotally attached to the plate and the second arm pivotally attached to the second branch of the bifurcated bracket. The arms of the link are paired for pivotal movement for a first open position when the sensor is in an inoperative position to a second closed position when the sensor is in an operative position.

12 Claims, 3 Drawing Figures

MARINE SENSOR MOUNTING MECHANISM

FIELD OF THE INVENTION

This invention relates to mechanism for mounting electronic sensors, such as transducers, on the hulls of boats and, more particularly, is directed to a mounting mechanism which permits the sensor to move from an operative to an inoperative position. When the sensor is in the operative position, if it is struck by a submerged or floating object, it will release, thereby reducing or eliminating damage.

BACKGROUND OF THE INVENTION

Marine sensors for measuring water depth, boat speed, temperature, and the like, are available in the marketplace for amateur and professional boatsmen. These sensors may measure one, or any combination of speed, depth, and temperature. Sensors illustrative of this type are sold by the Airmar Technology Corporation of Amherst, N.H. The sensors themselves are precision electronic devices and, while not delicate per se, they can be damaged if stuck by a floating or submerged object since they are normally positioned on the exterior of the hull of a boat. Frequently, the sensor is secured to the transom of the boat and is positioned to project slightly below the bottom to be certain that it is in a stream of bubble-free water, or water which is free of aeration, moving relative to the hull. Such sensors have particular utility on relatively high speed boats, i.e., those going from 30 to 70 miles an hour. With a boat going at such speed, striking a floating or submerged object could damage such an sensor.

Accordingly, one of the objects of this invention is to provide means for mounting such sensors on boats wherein they will release if they are struck by an object.

When a boat is traveling at high speed, if the sensor is struck by an object and knocked out of operating position, it is not always possible to reset the sensor in the operative position while the boat is traveling.

Accordingly, another object of this invention is to provide a marine sensor mounting mechanism which will not only permit the sensor to release from its operative position if struck by a waterborne object, but to reset itself to such position automatically after contact.

The force with which an object can strike a boat or the marine sensor attached to it is a function of the speed of the boat, the faster the speed, the harder the contact. At higher speeds, the release mechanism must maintain the sensor in its operative position with a greater degree of force than when the boat is going at a lower speed.

Accordingly, another object of this invention is to provide means for maintaining the marine sensor in its operative position while, at the same time, making it releasable to impact and resetable to the operative position after impact with means for adjusting the yield force holding the sensor in operative position as a function of the top speed capacity of the boat. During the launching and hauling of a boat whether by cradle or traveling hoist, the sensor is exposed to damage when in the operative position. The same is true when beaching a boat or when placed on racks in sheds for the winter.

Furthermore, when a boat is towed on a trailer, if the sensor is in the operative position, it can pick up road film and tar which impairs subsequent wetability if not cleaned off.

Accordingly, still another object of this invention is to provide marine sensor mounting mechanism which may easily be manually operated to reposition the sensor from the operative to an inoperative storage position.

The above and other features of the invention including various novel details of construction and combinations of parts will now be more particularly described with reference to the accompanying drawings and pointed out in the claims. It will be understood that the particular marine sensor mounting mechanism embodying the invention is shown by way of illustration only and not as a limitation of the invention. The principles and features of this invention may be employed in varied and numerous embodiments without departing from the scope of the invention.

BRIEF SUMMARY OF THE INVENTION

Figure 1:
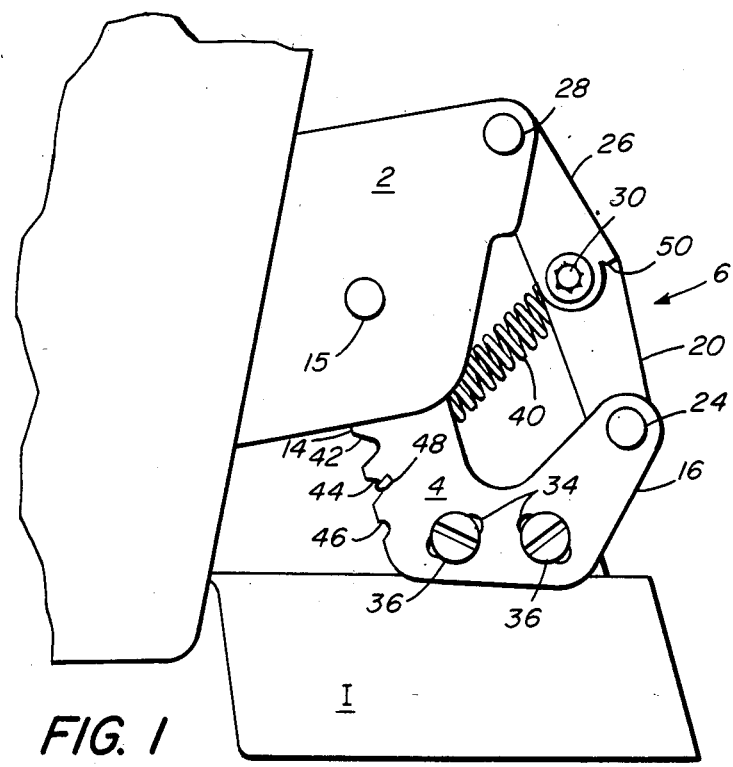
FIG. 1 is a side elevation of a marine sensor mounting mechanism secured to the hull of a boat and located in operating position.

The invention resides in mechanism for mounting a marine sensor on a boat and includes at least one mounting plate which is securable to the hull of a boat. A two-branch bifurcated bracket has one branch pivotally attached to the plate. A two-arm toggle link has one arm pivotally attached to the plate and a second arm pivotally attached to the second branch of the bifurcated bracket. The marine sensor is adjustably secured to the bracket to accommodate the various transom angles found on boats which typically are from 0 degrees to about 20 degrees.

The arms of the toggle link are joined for pivotal movement from a first open position wherein the bracket and the sensor secured to it are in an upper or storage position to a second closed position wherein the bracket and the sensor are in a lower or operative position.

The invention may also be embodied in a mounting mechanism which includes a pair of spaced parallel plates, a pair of spaced two-branch bifurcated brackets and a pair of spaced two-arm toggle links.

Tension means in the form of one or more coil springs hold the toggle links releasably in the closed position to maintain the sensor in its operative position. When the sensor is struck by a floating or submerged object, it pivots out of the way against the force of the coil spring. If the toggle links pass center, the sensor is pivoted upwardly out of the way and is maintained in that position. If, however, the impact is light or of short duration, the sensor pivots out of the way but is returned to the operative position by the spring without requiring it to be reset.

Means are provided to position the mounting mechanism on the boat in a plurality of positions and additional means are provided for mounting the sensor on the mounting mechanism in a plurality of heightwise positions as well as angular positions relative to the boat to assume the sensor is positioned in a water stream under the boat that is free of aeration.

The toggle links are limited in their movement into the operative position to assure that the sensor will always return to the position in which it was originally set heightwise relative to the hull of the boat and to its original angular relationship thereto.

BEST MODE OF CARRYING OUT THE INVENTION

Normally the marine sensor or instrument I is secured to the transom of the hull of a boat close to its bottom but need not necessarily be secured at this position. For example, it may be secured to a step formed in the transom of the boat.

The invention will be described with reference to bracketing mechanism which includes a pair of spaced, parallel, mounting plates 2 which are securable to the boat. Pivoted on the brackets 2 are a pair of spaced, two-branch bifurcated brackets 4 and a pair of spaced, two-arm toggle links 6.

Whereas the preferred embodiment shown in the drawings includes the paired plates, brackets, and links. It will be understood that in its broadest concept the invention contemplates using but a single plate, bracket and toggle link and their associated mechanism. This is represented by the structure shown on either side of the vertical break line running through FIG. 3.

Figure 3:
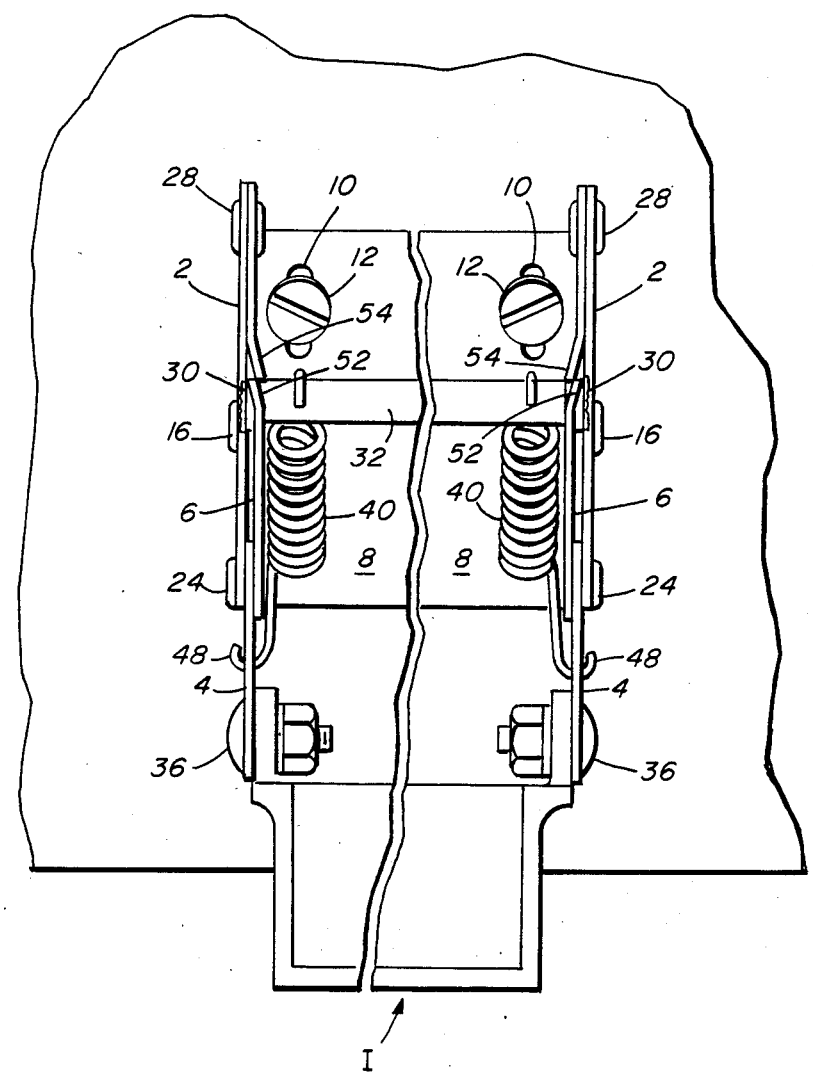
FIG. 3 is a rear elevation of the mechanism shown in FIG. 2.

Either a single or spaced parallel mounting plates 2 may be individually secured to the boat or be joined together by a web 8, FIG. 3, which may be either integral with the plates 2 or secured by other conventional means. The web 8 includes a pair of spaced vertical slots 10. Screws 12 pass through the slots and may be threaded into the boat. This mechanism permits the brackets 2 to be adjustable heightwise relative to the boat in a plurality of positions.

The spaced two-branch bifurcated brackets 4 as seen in FIG. 1, are substantially U-shaped and have a first branch 14 and a second branch 16. The first branch 14 of each of the brackets 4 is pivotally secured at 15 to one of the pair of plates 2. The two-arm toggle links 6 have one arm 20 pivotally attached at 24 to the second branch 16 of the bracket 4. The other arm 26 of each toggle link is pivotally secured at 28 to one of the plates 2.

The arms 20 and 26 of the toggle link 6 are joined for pivotal movement by pivot means 30. When a pair of plates 2, brackets 4, and links 6 are employed, the links 6 are joined by a horizontal bar 32, FIG. 3, passing between them.

Diagonal elongated slots 34 are formed in the brackets 4 intermediate the branches 14 and 16. Passing through the slots 34 are adjusting bolts 36 which permit the marine sensor I to be secured to the brackets 4 in a plurality of positions. This adjusting mechanism is used to accommodate the transom angle as well as to align the sensor both heightwise and parallel to the bottom of the boat or at an angle thereto. This depends upon the shape of the boat, the shape of the sensor, and the function that the sensor is to perform.

Tension means in the form of springs 40 are stretched between the bar 32 which extends between the toggle links 6 and the bracket 4. A plurality of spaced notches 42, 44, and 46, are formed in the branch 14 of the bracket 4 to receive the looped end 48 of the tension spring 40. The distance that the notches are spaced from the pivot point 30 of the toggle link varies and increases from notch 42 through 46 to increase the tension on the spring 40 in predetermined amounts as a function of the top speed that the boat will travel.

The arms 20 and 26 of the toggle links 6 abut at 50 (FIG. 1). Formed on each of the arms are mating offset flanges 52 and 54 (FIG. 3). The abutting relationship of the flanges determines the closed position of the toggle links limits the movement of the link beyond the position shown in FIG. 2, movement to that position being created by the tension in the spring 40.

The mechanism operates in the following manner. Whether a single plate mounting mechanism is employed or a parallel spaced plate mechanism as shown in the drawings, the operation is the same. The marine sensor I is loosely attached to the bracket 4 by the bolts 36. The bracket 2 is secured loosely to the hull of a boat by the screws 12. The sensor is then positioned relative to the bottom of the boat that it projects from about ⅛ inch to ½ inch below the hull of the boat by moving the mounting mechanism to the desired position and tightening the screws 12. The angular relationship of the sensor I relative to the bottom of the boat determined by the adjusting means comprising the bolts 36 and the inclined slots 34. Both heightwise and angular adjustment can be made selectively by this adjusting means.

The spring 40 is placed in one of the slots 42, 44, or 46, in the bracket 4 depending upon the anticipated speed of the boat. Springs of different tensions can be employed to gain greater or less tension between the bracket 4 and the toggle link 6. If, for example, with a given spring, it were desired to have the sensor release from the operating position at a boat speed of 40 miles per hour (its maximum speed), the spring would be placed in notch 42. If the maximum boat speed is to be 50 miles an hour, the spring would be placed in notch 44 and if the anticipated speed is 60 miles an hour, it would be placed in notch 46.

Figure 2:
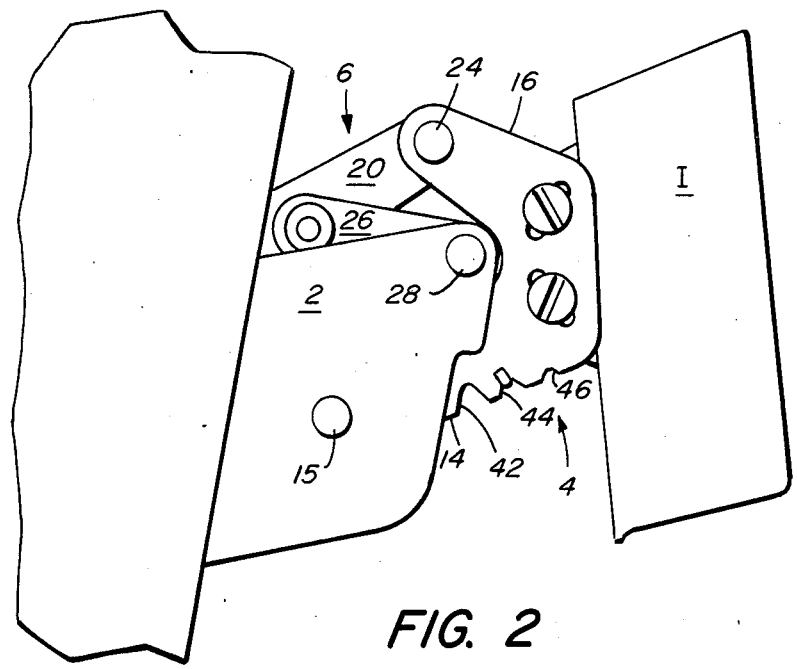
FIG. 2 is a view similar to FIG. 1 wherein the sensor and the mounting mechanism are in the inoperative or storage position.

If in storing the boat or hauling the boat prior or after launching, it is desired to move the marine sensor from the operating position shown in FIG. 1 to the up or inoperative position in FIG. 2, the bar 32 would be gripped and pulled upwardly. To aid in this a lanyard can be attached to the bar 32. When it is desired to place the sensor in the operating position or reset it after an impact, the bar 32 or sensor is rotated causing the bracket 4 to rotate in a clockwise direction as viewed in the Figures about the pivot point 15. The arm 26 of the toggle link 6 rotates about the pivot point 28 and the arm 20 rotates about the pivot point 24 on the branch 22 of the bracket 4. As the toggle link moves from the position shown in FIG. 1, the spring 40 is stretched until the toggle link passes center, thereupon it contracts pulling the toggle link pivot point 30 toward the branch 14 of the bracket 4 until the toggle link reaches the closed position where the offset portions 54 come into abutment at 50 as seen in FIG. 1.

As the boat proceeds through the water, the marine sensor I will perform its intended function of measuring depth, speed, and temperature or any combination thereof. Upon striking a submerged or floating object such as driftwood, the sensor will be urged rearwardly with the bracket 4 pivoting about pivot point 15. At this time, the spring tension increases as the toggle link opens. If the toggle link does not pass dead center which is a position between that shown in FIG. 1 and FIG. 2, the spring will return the bracket 4 and toggle link 6 to the operating position shown in FIG. 3.

If the toggle link does go beyond center, as for example by the sensor striking a heavy or stationary object, it will stay in the up or inoperative position with the toggle links held open under the force of the spring 40. Thereafter, the mechanism must be reset by pivoting it in a clockwise direction from the FIG. 2 to the FIG. 1 position.

We claim:

1. Mechanism for mounting a marine sensor on a boat comprising:
   - a mounting plate securable to a boat,
   - a substantially U-shaped, two-branch bifurcated bracket, having one branch pivotally attached to the plate,
   - a two-arm toggle link, having one arm pivotally attached to the plate and the second arm pivotally attached to the second branch of the bifurcated bracket,
   - means pivotally joining the arms together,
   - means for securing a marine sensor to the bifurcated bracket intermediate the branches,
   - the arms of the link being joined for pivotal movement from an open position wherein the arms of the toggle link are disposed at an acute angle and the bifurcated bracket and the sensor secured to it are in an inoperative position to a closed position wherein the arms of the toggle link are aligned and the bifurcated bracket and the sensor are in an operative position.
   - tension means between the means pivotally joining the arms and the branch of the bifurcated bracket that is pivotally attached to the plate, for holding the toggle links in the closed position to maintain the sensor in the operative position, and
   - means for varying the tension of the tension means.

2. Mechanism according to claim 1 wherein there are adjustable means for securing the bracket to the boat in a plurality of positions.

3. Mechanism according to claim 1 wherein there are adjustable means for securing the sensor to the bracket in a plurality of positions.

4. Mechanism according to claim 1 wherein there are means for limiting movement of the toggle link beyond the closed position when moving from the open position.

5. Mechanism for mounting a marine sensor on a boat comprising:
   - a pair of spaced, parallel, mounting plates securable to a boat,
   - a pair of spaced, substantially U-shaped, two-branch bifurcated brackets, each bracket having a first branch pivotally attached to a separate plate,
   - a pair of spaced, two-arm toggle links, each link having one arm pivotally attached to a separate plat and the second arm pivotally attached to the second branch of the bifurcated bracket which is attached the plate,
   - means pivotally joining the arms of each link together,
   - means for securing a marine sensor to the bifurcated brackets intermediate the branches,
   - the arms of each link being joined for pivotal movement from an open position wherein the arms of each toggle link are disposed at an acute angle and the bifurcated brackets and the sensor secured to them are in an inoperative position, to a closed position wherein the arms of each toggle link are aligned and the bifurcated brackets and the sensor are in an operative position and
   - tension means between the means pivotally joining each of the arms and the branches of the bifurcated bracket that are pivotally attached to the plate, for holding the toggle links in the closed position to maintain the sensor in the operative positions, and
   - means for varying the tension of the tension means.

6. Mechanism according to claim 5 wherein there are adjustable means for securing the bracket to the boat in a plurality of positions.

7. Mechanism according to claim 5 wherein there are adjustable means for securing the sensor to the brackets in a plurality of positions.

8. Mechanism according to claim 5 wherein there are means for limiting movement of the toggle link beyond the closed position when moving from the open position.

9. Mechanisim for mounting a marine sensor on a boat comprising:
   - a pair of spaced, parallel, mounting plates securable to a boat,
   - a pair of spaced, substantially U-shaped two-branch bifurcated brackets, each bracket having a first branch pivotally attached to a separate plate,
   - a pair of spaced, two-arm toggle links, each link having one arm pivotally attached to a separate plate and the second arm pivotally attached to the second branch of the bifurcated bracket which is attached the plate,
   - means pivotally joining the arms of each link,
   - means for securing a marine sensor to the bifuracted brackets intermediate the branches,
   - the arms of each link being joined for pivotal movement from an open position wherein the arms of each toggle link are disposed at an acute angle and the bifurcated brackets and the sensor secured to them are in an inoperative position, to a closed position wherein the arms of each toggle link are aligned and the bifurcated brackets and the sensor are in an operative position,
   - tension means comprising a pair of springs between the means pivotally joining each of the arms and the branches of the bifurcated bracket that is pivotally attached to the plate for holding the toggle links releasably in the closed position to maintain the sensor in the operative position, and
   - means on the branches of the bifurcated bracket for varying the tension of the springs.

10. Mechanism according to claim 9 wherein there are adjustable means for securing the bracket to the boat in a plurality of positions.

11. Mechanism according to claim 9 wherein there are adjustable means for securing the sensor to the brackets in a plurality of positions.

12. Mechanism according to claim 9 wherein there are means for limiting movement of the toggle link beyond the closed position when moving from the open position.

* * * * *